United States Patent [19]
Jones et al.

[11] Patent Number: 5,345,058
[45] Date of Patent: Sep. 6, 1994

[54] MAGNETIC FIELD NEGATING SYSTEM FOR WELDMENTS

[75] Inventors: Robert B. Jones, Windsor; John C. Reinke, Jr., Smithfield; Clarence E. Snyder, Jr., Harley D. Huebner, both of Newport News, all of Va.

[73] Assignee: Newport News Shipbuilding and Dry Dock Company, Newport News, Va.

[21] Appl. No.: 925,955

[22] Filed: Aug. 5, 1992

[51] Int. Cl.⁵ .............................................. B23K 9/08
[52] U.S. Cl. ............................................... 219/123
[58] Field of Search ........................ 219/123; 361/149

[56] References Cited

U.S. PATENT DOCUMENTS

| | | |
|---|---|---|
| 388,245 | 8/1888 | Benardos . |
| 1,947,077 | 2/1934 | Chapman . |
| 2,406,474 | 8/1946 | Perrin . |
| 2,472,851 | 6/1949 | Landis et al. . |
| 2,475,183 | 7/1949 | Gibson . |
| 2,773,969 | 12/1956 | Gunther . |
| 2,994,763 | 8/1961 | Schultz . |
| 3,584,181 | 6/1971 | Nemoto et al. . |
| 3,626,145 | 12/1971 | Jackson . |
| 3,941,974 | 3/1976 | Kano et al. . |
| 4,060,845 | 11/1977 | Bowers et al. . |
| 4,107,503 | 8/1978 | Koshiga et al. . |
| 4,761,536 | 8/1988 | Blakeley . |

FOREIGN PATENT DOCUMENTS

| | | | |
|---|---|---|---|
| 50-27452 | 9/1975 | Japan | 219/123 |
| 59-107772 | 6/1984 | Japan | 219/123 |
| 656760 | 4/1979 | U.S.S.R. . | |
| 916169 | 4/1982 | U.S.S.R. . | |
| 2158758 | 11/1985 | United Kingdom | 219/123 |

*Primary Examiner*—Clifford C. Shaw
*Attorney, Agent, or Firm*—Lalos & Keegan

[57] ABSTRACT

A system for negating remnant magnetic fields in a weld joint between two workpieces includes a controller and an electromagnet with two feet that form the pole pieces. The electromagnet feet are formed with surfaces that provide a substantial area for magnetic flux coupling with each workpiece on either side of the weld joint. Inside and outside surface pairs on the electromagnet feet permit effective placement of the electromagnet on the outside or inside of right angle corners formed by two workpieces to be welded. The electromagnet feet may be rotatively connected to the core to accommodate various workpiece configurations. The controller includes an autotransformer and two separate manually operable current controls.

20 Claims, 3 Drawing Sheets

MAGNETIC FIELD NEGATING SYSTEM FOR WELDMENTS

FIELD OF THE INVENTION

This invention relates to welding, and more particularly to apparatus and methods for improving the quality of welds. Specifically, such improvement is accomplished by minimizing remnant magnetic fields in the area being welded.

BACKGROUND OF THE INVENTION

A long recognized problem in welding, specifically electric arc welding, is arc stray or drift. This problem often results in a poor weld due to the varying, nonuniform blow of the arc on the seam to be welded. A variety of methods and apparatus have been devised to control arc stray. U.S. Pat. No. 1,947,077 to Chapman, for example, utilizes an electric current through a backing strip or U-shaped element that creates a magnetic field. This field coacts with the field set up by the welding electrode to "blow" the arc forward in advance of the electrode as it moves along the seam. U.S. Pat. No. 388,245 to Bernardos utilizes an electromagnet located beneath the plates to be welded to influence the electric arc U.S. Pat. No. 2,773,969 to Gunther utilizes a "magnetic girdle" for use with pipelines. U.S. Pat. No. 2,472,851 to Landis utilizes a plurality of coils concentric with an annular electrode to control arc movement in a circular path. U.S. Pat. No. 2,475,183 to Gibson includes a magnet with a pole piece extension to deflect the arc toward the pole piece and thus control its direction during welding. U.S. Pat. No. 3,584,181 to Nemote includes a magnetizing coil that surrounds a rod-shaped workpiece. The magnetizing coil is intended to overcome the circular field created by welding current. Each of these prior art apparatus and methods attempts to control the direction of arc movement by imposing a magnetic field upon it. Such apparatus and methods have been ineffective because of the difficulty in determining and maintaining the proper magnitude and direction of the magnetic field required to achieve the desired effect on the arc. Often the actual effect of such devices is to exacerbate the problem of arc stray.

U.S. Pat. No. 2,994,763 to Schultz and U.S. Pat. No. 3,626,145 to Jackson attempt to overcome the varying magnetic effects by monitoring certain parameters. Schultz uses a pair of photoelectric cells to monitor the position of the arc and an electromagnet that is responsive to the sensed arc position. The electromagnet is intended to produce a force field that compensates for detected drift. Jackson uses a Hall-effect probe mounted immediately ahead of the arc to detect the magnetic environment about the arc. A detector and control circuit is intended to receive signals from the probe and control the current to an electromagnet to set up a "preselected and optimized" magnetic environment. The drawback to such systems is the inability to determine and control an optimum magnetic environment. Systems that attempt to manipulate the arc path with external magnetic fields have been ineffective.

Additional apparatus and methods have been devised for providing a better weld through the use of a controlled magnetic field. Specifically, U.S. Pat. No. 4,107,503 to Koshiya and U.S. Pat. No. 4,716,536 to Blakeley seek to overcome residual or remnant magnetic fields that are found in ferritic materials to be welded. Koshiya is directed to a system to counter magnetic fields created by prior welding operations. In Koshiya, in order to reduce arc blow occurring during welding of the outside of a pipe blank, the direct current in the line feeding the consumable electrode is reversed from that supplied during welding on the inside of the pipe blank. The same magnitude of current is used for welding and for eliminating residual magnetism. This method is often ineffective because the residual magnetism in the pipe blank is not always caused solely by the prior welding operation and simply reversing the current can exacerbate arc blow. Further this system is only applicable to situations where a prior welding operation has been performed and the magnitude and direction of the welding current are known. Blakeley attempts to remove remnant magnetic fields by placing loops of coils on the plates to be welded adjacent to the weld joint. Current is passed through the coils in a direction and magnitude sufficient to counter the remnant magnetic field as measured by a gaussmeter. However, laying of coils in the area of welding can be cumbersome. Further, proper selection of the placement and exact alignment of coils to achieve the desired magnetic effect may be difficult in actual practice.

SUMMARY OF THE INVENTION

The present invention overcomes the disadvantages of the prior art by providing an effective and easy to use device for negating or countering remnant magnetic fields in the area to be welded. The device consists of a hand-held DC electromagnet and a controller for the electromagnet. In practice, the electromagnet is placed on the weld joint in the area where a residual magnetic field has been detected by a gaussmeter. The controller is manually adjusted to vary the magnitude and direction of DC current to the electromagnet, and thus the magnitude and direction of the magnetic field produced thereby, until the detected field in the weld joint reaches zero or some acceptably minimal value.

This system provides the operator with a simple and highly effective way of eliminating remnant magnetic fields in the local area to be welded. The operator can visually observe the effects of adjustment to the electromagnet controller and make relatively precise adjustments as required. This greatly eliminates arc blow, rough weld appearance and poor weld fusion without the complex, cumbersome and often ineffective apparatus of the prior art. The system is effective in counteracting magnetic fields up to 2,000 gauss across a ½ inch weld joint in 1 inch steel. The electromagnet is especially effective in creating the desired magnetic field in the weld joint because the electromagnet includes feet that couple the magnetic flux to the workpieces to be welded along a significant surface area, specifically the length of the electromagnet. Another feature of the present invention is that the feet of the electromagnet have oppositely facing angled surfaces that permit the magnet to be physically placed on the inside or outside of a 90 degree corner, while still maintaining significant surface area coupling with the weld pieces.

In one embodiment, the feet are rotatively connected to the electromagnet core to accommodate various workpiece configurations, e.g. for pipe welds or where the workpieces form obtuse or acute angles.

A further feature of the present invention is the effectiveness of the controller. It uses a variable autotransformer and two current controls; one to control the magnitude and the other to select the direction of current. This arrangement provides superior control over the level and quality of current supplied to the electromagnet.

These and other features of the present invention will be evident from the foregoing detailed description with reference to the accompanying drawings.

DETAILED DESCRIPTION

Figure 1:
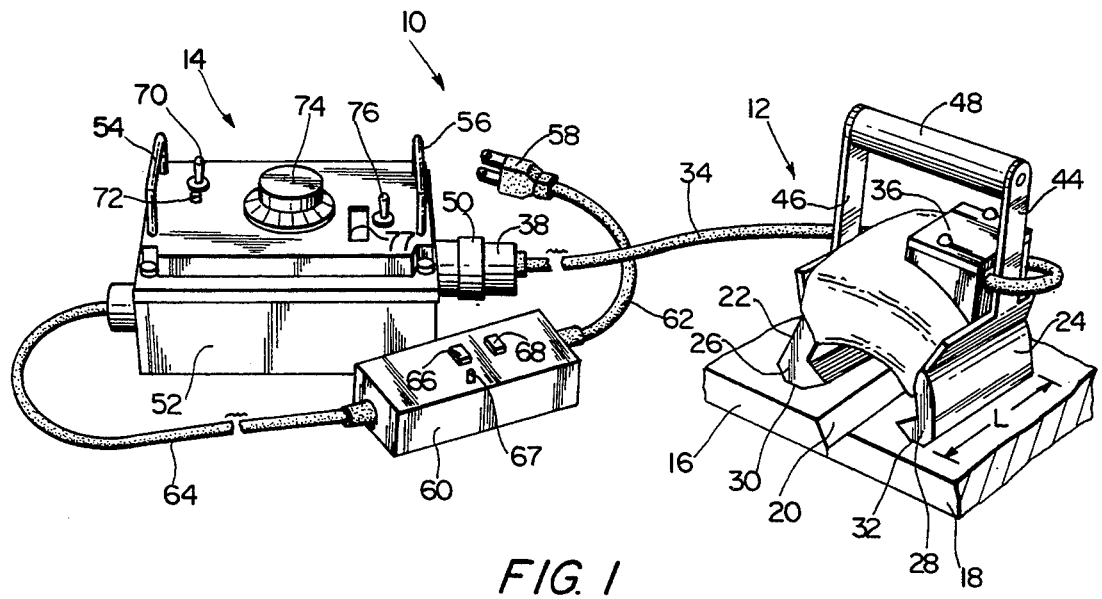
FIG. 1 is a perspective view of the magnetic field negating system of the present invention showing the electromagnet and controller.

FIG. 1 shows the magnetic field negating system 10 of the present invention. Its two major components are electromagnet 12 and controller 14. In operation, electromagnet 12 will be placed on the surfaces of two workpieces 16, 18 (e.g. steel plates) that meet at weld joint 20. Electromagnet 12 will straddle weld joint 20, as shown, with a first leg 22 positioned on one workpiece or plate 16 and a second leg 24 positioned on the second plate 18. Legs 22 and 24 terminate with feet 26 and 28, respectively, that couple magnetic flux to the respective plates along substantial flat surfaces 30 and 32 that each extend substantially the length of electromagnet 12.

Figure 7:
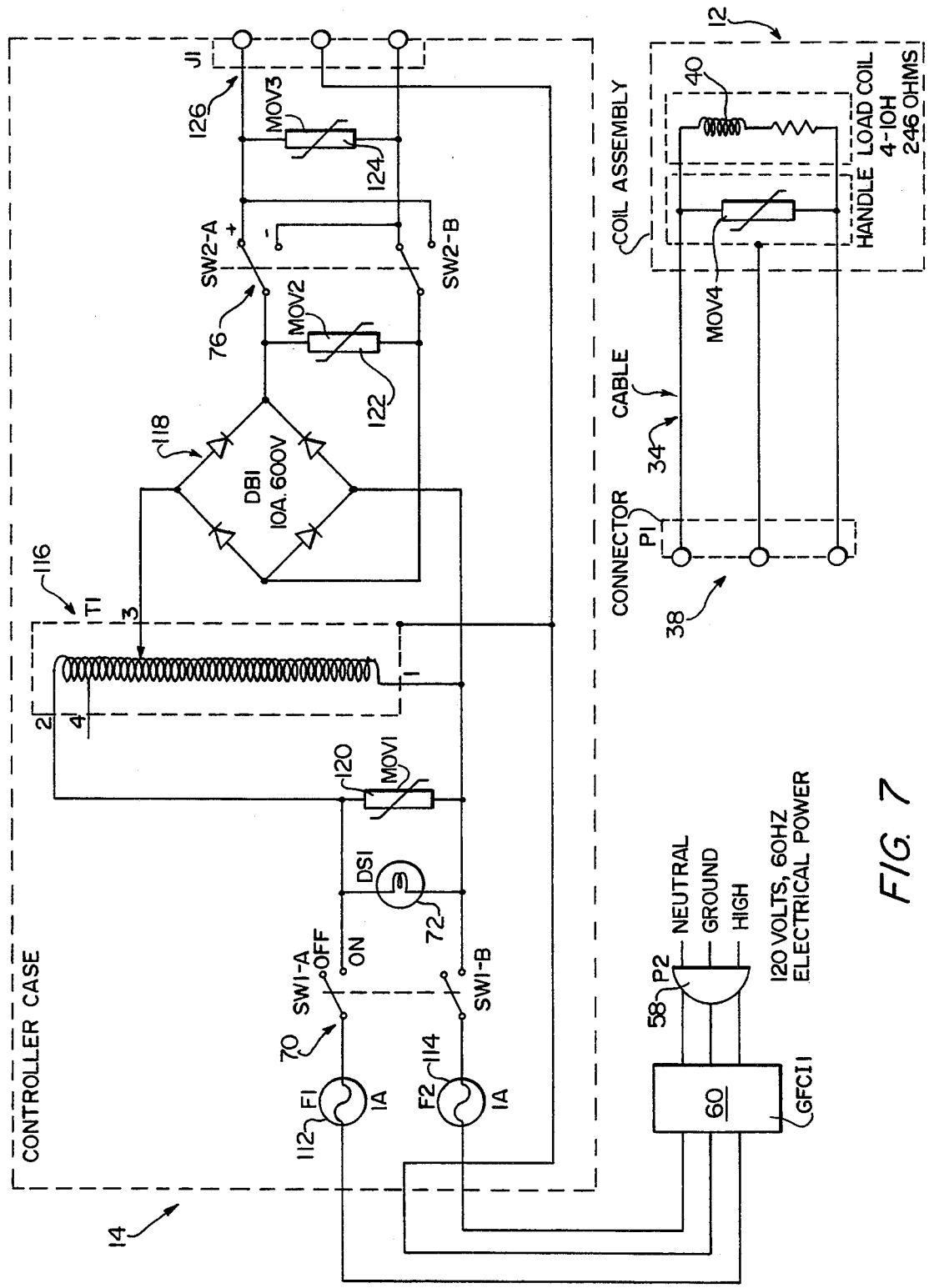
FIG. 7 is an electrical circuit schematic of the electromagnet controller of the present invention.

Electromagnet 12 is connected to controller 14 through electrical cable 34 that is connected on the electromagnet end to a box 36 integral with the top of electromagnet 12. As shown schematically in FIG. 7 the conductors of cable 34 are soldered to pins in connector 38. Cable 34 is in turn connected to coil 40. A metal oxide varistor (MOV4), labelled 42 in FIG. 7, is mounted in box 36 to suppress voltage surges generated by the electromagnet's collapsing magnet field if cable 34 is disconnected or severed while the coil is carrying current. The aluminum handle straps 44, 46 (FIG. 1) are safety grounded through cable 34. The electromagnet's laminated steel core 78 may also be electrically connected to the aluminum handle straps. The handle 48 of the electromagnet may be any suitable material, wood or hard plastic for example.

Certain nominal electrical/mechanical characteristics of an embodiment of the electromagnet assembly of the present invention are as follows: inductance is approximately 4 henries on non-magnetic material and 10 henries on thick steel; resistance is approximately 250 ohms; generated magnetic field is zero to +/− 3200 gauss (while on 1½ inch pieces of steel with a 1 inch tapering to 1/10 inch air gap when powered from a 120 VAC electrical power source); overall dimensions (L×W×H) are approximately 4"×5"×6−½"; weight is approximately 9 lbs.

Referring again to FIG. 1, the controller 14 includes a plug jack 50 for receiving the pin connector 38 from cable 34, connected to electromagnet 12. Controller 14 is contained in a fiberglass box 52 with handles 54, 56. All metal on the outside of box 52 is electrically grounded through the power cord. The controller 14 is electrically connected to a power source (typically 120 volts, 60 Hz) through plug 58, ground fault circuit interrupter (GFCI) 60 and electrical cables 62 and 64. The ground fault circuit interrupter, which protects the equipment and personnel from electrical ground faults, includes a TEST button 66, a RESET button 68 and ON/OFF indicator lamp 67. The controller 14 includes an ON/OFF switch 70, an indicator lamp 72, a manually operable autotransformer rotary dial 74 for controlling the magnitude of DC current delivered to electromagnet 12, and a manually operable polarity switch 76 for controlling the direction of current delivered to electromagnet 12. Indicator 77 identifies the + or − positions of polarity switch 76.

Certain nominal electrical/mechanical characteristics of an embodiment of the controller of the present invention are as follows: input voltage is 120 volts AC (+/−10%), 60 Hz; input current is less than ½ ampere (120 VAC transformer tap); maximum output current (into the electromagnet) is approximately 450 milliamperes DC with the 120 volt transformer tap and approximately 500 milliamperes with the 132 volt transformer tap; overall dimensions (L×W×H) are approximately 7"×5"×4"; weight is approximately 7 lbs.

Figure 2:
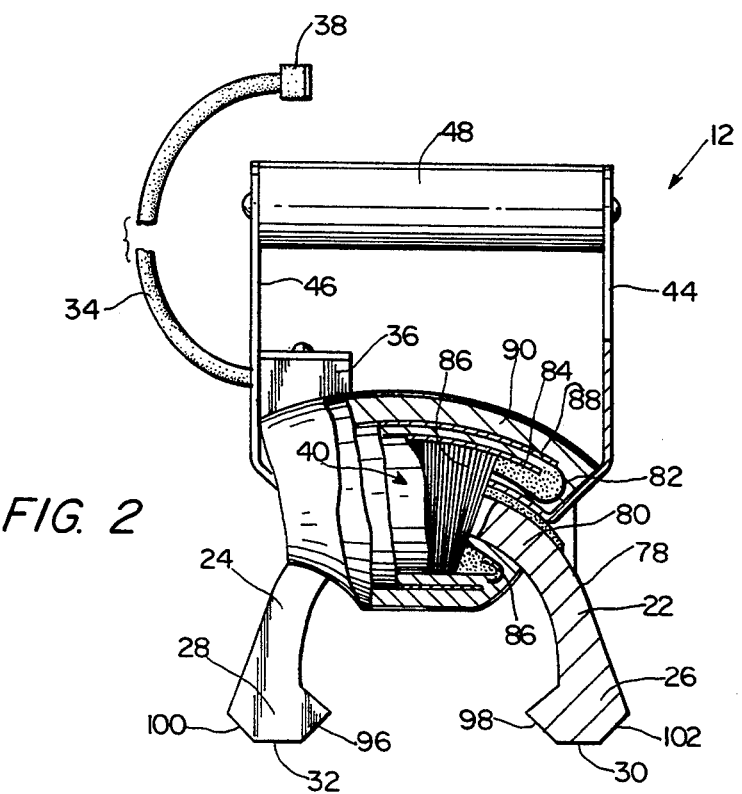
FIG. 2 is a front view of the electromagnet of the present invention shown in partial cross-section.

Referring to FIG. 2, electromagnet 12 includes a laminated steel core 78 which, in the embodiment shown, comprises an arcuate body section 80, legs 22 and 24, and feet 26 and 28. Electromagnet coil 40 comprises four thousand (4,000) turns of 28 gauge, varnish-insulated copper wire 86 wound around core 78. This assembly may include cell paper 82, a layer of fiberglass 84 in surrounding relationship to wire 86, and a coat 88 of varnish for insulation. The entire assembly may be coated on the outside with a thin layer 90 of Arcoset, a mineral filled epoxy. As best shown in FIG. 2, aluminum handle straps 44, 46 may be formed from a single U-shaped piece.

A feature of the present invention is the shape of feet 26 and 28, which feature enables the electromagnet 12 to sit flat on a horizontal surface formed by two workpieces to be welded, on the inside of a 90 degree corner formed between two pieces or on the outside of a 90 degree corner. Foot 26 is formed with a primary surface 30 that extends substantially the length L (FIG. 1) of electromagnet 12. Foot 28 is formed with a corresponding primary surface 32 that also extends substantially the length of electromagnet 12. As shown in FIG. 2, primary surface 30 and primary surface 32 are parallel and lie in the same horizontal plane. Thus, when placed on two flat workpieces, e.g. plates 16 and 18, as shown in FIG. 1, the feet 26 and 28 couple the magnetic flux to the plates along a substantial surface extending the length of the electromagnet. As will be readily appreciated, feet 26 and 28 form the pole pieces of electromagnet 12. In order to most effectively create and maximize the magnetic field in the air gap formed at weld joint 20 (FIG. 1), it is important to have a substantial surface coupling between the pole pieces (i.e. feet 26 and 28) of electromagnet 12 and the plates 16 and 18. Without such coupling, the remnant magnetic fields in the air gap formed by joint 20 cannot be effectively negated.

Figure 3:
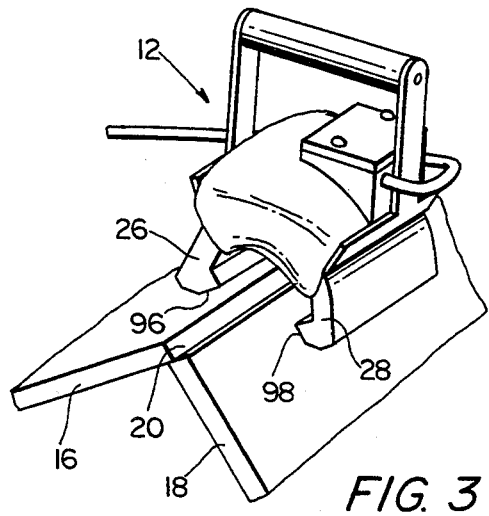
FIG. 3 is a perspective view of the electromagnet assembly stationed on the outside corner formed by two pieces to be welded together.

It is often necessary to weld two workpieces that meet at a right angle. The present invention accommodates such situations with pairs of generally opposing surfaces formed on feet 26 and 28. Inside surface 96 formed on foot 28 extends substantially the length of electromagnet 12. Correspondingly, inside surface 98 formed on foot 26 extends substantially the length of electromagnet 12. As shown in FIG. 2, generally opposing surfaces 96 and 98 are formed at a substantially right angle (90 degrees) to one another. Inside surface 96 of foot 28 is formed at a substantially 45 degree angle to primary surface 32, and correspondingly inside surface 98 of foot 26 is formed at a substantially 45 degree angle to primary surface 30. Inside surfaces 96 and 98 permit electromagnet 12 to maintain a substantial surface coupling with workpieces 16 and 18 where such pieces meet at a right angle and the electromagnet 12 is placed on the outside of the corner formed by pieces 16 and 18, as best shown in FIG. 3.

Figure 4:
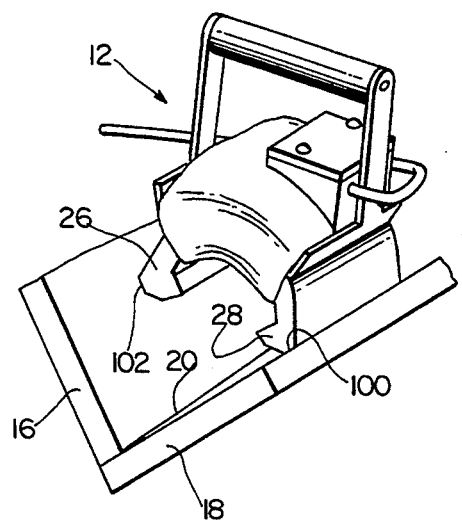
FIG. 4 is a perspective view of the electromagnet assembly stationed on the inside corner formed by two pieces to be welded together.

Electromagnet 12 is also provided with coupling surfaces to accommodate welds on the inside of corners formed between two workpieces to be welded. Referring again to FIG. 2, outwardly facing surfaces 100 and 102 are formed on feet 28 and 26, respectively. These surfaces, formed at substantially a right angle to one another, provide outside surfaces for magnetic flux coupling with the weld pieces, along substantially the length of electromagnet 12. As best shown in FIG. 4, when workpieces 16 and 18 form a right angle corner and the weld is to be made on the inside of such corner, electromagnet 12 can be placed on the inside of the corner to negate any remnant magnetic field sensed in weld joint 20. As will be appreciated from FIG. 2, outside surface 100 is formed at a substantially 45 degree angle to primary surface 32 of foot 28, and correspondingly outside surface 102 is formed at a substantially 45 degree angle to primary surface 30 of foot 26.

Figure 5:
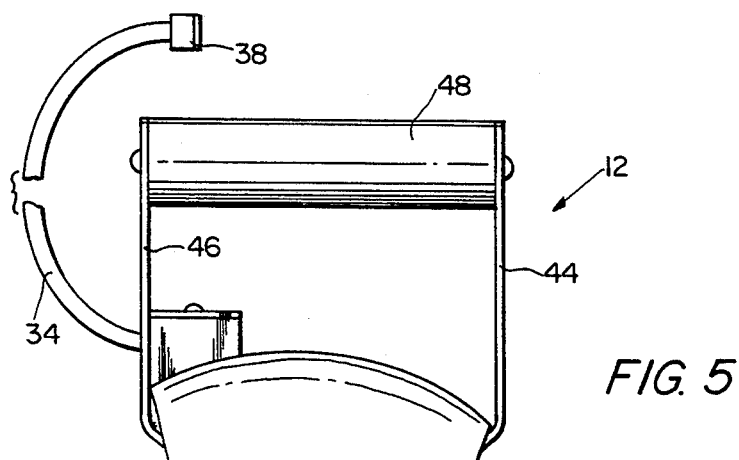
FIG. 5 is a front view of an embodiment of the electromagnet of the present invention in which the feet are rotatively connected to the core.

Another embodiment of electromagnet 12 is shown in FIG. 5. This embodiment is especially useful in situations where workpieces to be welded form neither a flat surface nor a right angle corner. The embodiment of FIG. 7 is useful with a wide range of workpiece configurations, including pipe welds. The advantage of such embodiment is that a maximum magnetic flux coupling area maintained between electromagnet 12 and the workpieces to be welded, even where the workpieces are arcuate or form obtuse or acute angles.

As shown in FIG. 5, foot 28 is rotatively connected to leg 24 of electromagnet core 78. This connection may be made by any suitable means. In the preferred embodiment shown in FIG. 5, this connection is made by a pivot 29, which may be a shaft or pin about which foot 28 rotates, thereby permitting angular displacement of foot 28 relative to core 78. Foot 28 is shown in phantom as 28A rotated to the inside and 28B rotated to the outside of core 78. Correspondingly, foot 26 is rotatively connected to leg 22 of core 78. Foot 26 rotates about pivot 31 and can be positioned at various angles relative to leg 22, as shown in phantom by exemplary inside position 26A and outside position 26B. As will be readily appreciated, this feature gives the electromagnet 12 great positional flexibility. Although only primary foot surfaces 30 and 32 are shown in FIG. 5, additional inside surfaces (e.g. 96, 98) and outside surfaces (100, 102) such as those shown in FIG. 2 may be utilized to ensure even greater surface coupling of magnetic flux to the workpieces.

Figure 6:
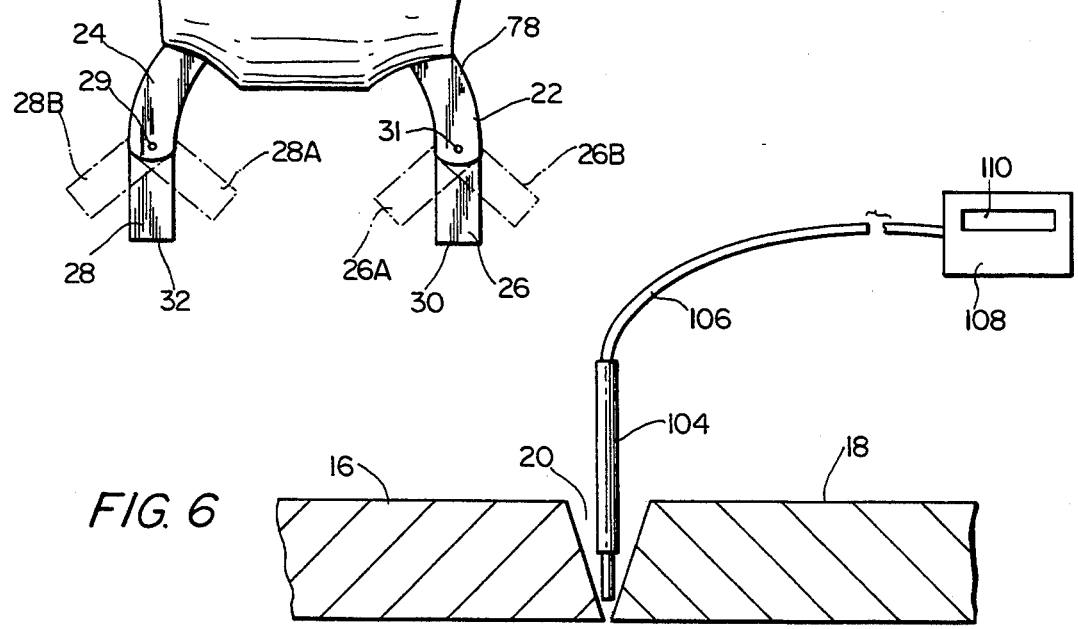
FIG. 6 is an elevational view, partly in cross-section showing the placement of a gaussmeter relative to two pieces to be welded.

FIG. 6 shows the related apparatus that may be used in the method of the present invention, to be described hereinafter. Electromagnet 12 and controller 14 are used to negate remnant magnetic fields in the area of weld joint 20. Such field may be measured and monitored during the welding operation. To sense the field, a conventional magnetic field sensor 104, e.g. a Hall effect probe, is placed in the V-shaped weld joint 20 formed between weld pieces 16 and 18. Sensor 104 is connected by an appropriate cable 106 to a conventional magnetometer 108 with a display scale 110 graduated in gauss. A conventional gaussmeter is suitable for the purposes of the subject invention.

In practice it may be found that precise measurement of the remnant magnetic field by sensor 104 is not necessary. The presence of the remnant magnetic field may be visually observed, for example, by its effect upon ferrous metal cuttings, scraps or other particles which will "stand up" aligned with magnetic lines of force. Switching on electromagnet 2 may cause these particles to lay down, and even fall out of the weld joint. This is an "indication" that the remnant magnetic field has been neutralized. In some cases, this rough indication may be sufficient. If the welding operation is performed without arc blow, the visual observation of magnetic field minimization was sufficient. If not, sensor 104 may have to be used as described above with reference to FIG. 6.

FIG. 7 is a schematic diagram of the controller 14 and electrical connections to the electromagnet 12. The controller 14 controls the magnitude and direction of the DC current flowing in the electromagnet 12. The controller accepts 60 Hz, 120 volt electrical power through plug 58 (P2) and the in-line ground fault interrupter 60 (GFCI1). Fuses 112 (F1) and 114 (F2) provide line-to-line (and back-up line-to-ground) over-current protection. Switch 70 (SW1) is the ON/OFF switch, and lamp 72 (DS1) indicates when controller 14 is on. Both sides of the power line are fused and switched since the unit may be run from a power source with neither side of the power line being neutral.

Transformer 116 (T1), a variable autotransformer, varies the AC voltage level going to the rest of the circuit. The transformer has two input taps: tap #2 for 120 volts out, and tap #4 for 132 volts out. Although the 132 volt tap may be used to produce slightly higher magnetic fields, the 120 volt tap provides finer current control and is the tap used in the preferred embodiment. The transformer's output goes to diode bridge 118 (DB1). This bridge converts the AC transformer voltage to DC and also provides a freewheeling path for the coil current during the valleys in the full wave rectified voltage. Switch 76 (SW2) switches the polarity of the output current and thereby the direction of the negating magnetic field produced by the electromagnet. Metal oxide varistors 120 (MOV1), 122 (MOV2), and 124 (MOV3) provide voltage surge protection for the controller and coil. These surges may be present on the AC power line or be generated internally when the coil current is suddenly interrupted. Such interruptions may be caused by unplugging the coil's cable 34 or reversing the coil current's direction switch 76 (SW2) when current is flowing in the coil. The electromagnet 12 is connected to controller 14 through cable 34, which terminates with plug 38 (P1) that mates with controller receptacle 126 (J1).

Controller 14 is provided with certain advantages in current control and quality due to the use of a relatively heavy autotransformer and two current controls: one (autotransformer rotary switch 74) to control the current's magnitude and the other (polarity switch 76) to switch its direction. Alternate designs based on solid state triacs suffer from certain disadvantages. These include susceptibility to electrical noise, poor current control at lower levels and significant hysteresis effects.

The magnetic field negating system of the present invention is effective not only because of the features provided by the electromagnet and controller but also because the system is easy to use. The following is an exemplary step by step operation of the magnetic field negating system of the present invention.

A. Initial Conditions and Assumptions
   1. Controller 14 unplugged from the electromagnet 12 and AC power
   2. Controller ON/OFF switch 70 in the OFF position
   3. Autotransformer rotary control 74 fully counterclockwise (CCW)
   4. Polarity switch 76 in either the + or − position
   5. A magnetic field sensing gaussmeter 108 and probe 104 available B. Plug the electromagnet's cable connector 38 (P1) into the controller's receptacle 126 (J1).

C. Plug the controller power cable's plug 58 (P2) into a standard 120 VAC power outlet. If the lamp 67 on the Ground Fault Circuit Interrupter 60 (GFCI) does not light, depress the GFCI's RESET button 68.

D. Test the Ground Fault Circuit Interrupter (GFCI) by depressing its TEST button 66. The GFCI's lamp 67 should turn off. Reset the GFCI by pressing its RESET button. The GFCI's lamp should turn on.

E. Place the electromagnet 12 across the weld joint not closer than one inch to the area to be welded.

F. Turn the controller's ON/OFF switch 70 (SW1) to ON. The lamp 72 on the controller should light.

G. Measure the magnetic field in the area of the joint to be welded with the gaussmeter 108.

H. Slowly rotate the controller's autotransformer control dial 74 clockwise (CW) to increase current in the electromagnet while monitoring the gaussmeter's reading. If the gaussmeter's reading increases, the current polarity is wrong. If this is the case, reduce the control back to zero (fully CCW) and switch the controller's polarity switch 76 to the other direction. Again increase the coil current by slowly rotating the autotransformer's control knob CW until the residual magnetic field measured with the gaussmeter is zero or the minimum value obtainable.

I. Remove the gaussmeter 108 from the area to be welded.

J. Start welding. Note that the negating system should be left on during the welding operation, and that the reach (effective canceling distance) of the electromagnet 12 will increase as the weld progresses.

K. Once the weld has progressed beyond the reach (effective cancelling distance) of the electromagnet, reduce the coil current to zero by rotating the control dial 74 fully CCW, and again perform steps G thru J.

The present invention, as described herein, provides an effective and easy to use system for reducing to a minimum remnant magnetic fields that contribute to arc blow. Various modifications and alternate embodiments of the present invention will be evident to those having ordinary skill in the art, such embodiments, modifications and changes being intended to fall within the scope of the invention as defined by the following claims.

We claim:

1. A system for temporarily, during welding operations, negating remnant magnetic fields that exist in the area of the weld joint formed between two workpieces to be welded together without demagnetizing said workpieces, comprising:
   an electromagnet comprising a core and a coil wound on said core;
   a control means electrically connected to said electromagnet for providing DC current to said coil to provide a temporary negating magnetic field during welding;
   said electromagnet core including at least a first foot and a second foot that each form a pole piece of said electromagnet;
   said first foot having at least a primary surface for coupling magnetic flux to a first one of said workpieces along a substantial surface area on a first side of said weld joint, and said second foot having at least a primary surface for coupling magnetic flux to a second one of said workpieces along a substantial surface area on a second side of said weld joint, and wherein said first foot primary surface and said second foot primary surface each extend substantially the length of said electromagnet, whereby said negating magnetic field is maximized in the area of said weld joint.

2. A system as in claim 1, wherein said first foot further includes an inside surface for coupling magnetic flux to a first one of said workpieces along a substantial surface area on a first side of said weld joint, and wherein said second foot includes an inside surface for coupling magnetic flux to a second one of said workpieces along a substantial surface area on a second side of said weld joint, and wherein said first foot inside surface and said second foot inside surface are formed at a substantially right angle to one another, whereby said electromagnet can be placed on the outside of a corner formed by said two workpieces while maintaining substantial surface coupling between said first and second workpieces and said first and second feet of said electromagnet.

3. A system as in claim 2 wherein said first foot inside surface and said second foot inside surface are formed in a generally opposing facing relationship.

4. A system as in claim 2, wherein said first foot inside surface and said second foot inside surface each extend substantially the length of said electromagnet.

5. A system as in claim 2, wherein said first foot inside surface is formed at a substantially 45 degree angle to said first foot primary surface and said second foot inside surface is formed at a substantially 45 degree angle to said second foot primary surface.

6. A system as in claim 1 or 2, wherein said first foot further includes an outside surface for coupling magnetic flux to a first one of said workpieces along a substantial surface area on a first side of said weld joint, and wherein said second foot further includes an outside surface for coupling magnetic flux to a second one of said workpieces along a substantial surface area on a second side of said weld joint, and wherein said first foot outside surface and said second foot outside surface are formed at a substantially right angle to one another, whereby said electromagnet can be placed on the inside of a corner formed by said two workpieces while maintaining substantial surface coupling between said first and second workpieces and said first and second feet of said electromagnet.

7. A system as in claim 4, wherein said first foot outside surface and said second foot outside surface each extend substantially the length of said electromagnet.

8. A system as in claim 6, wherein said first foot outside surface is formed at a substantially 45 degree angle to said first foot primary surface and said second foot outside surface is formed at a substantially 45 degree angle to said second foot primary surface.

9. A system as in claim 6, wherein said first foot outside surface is formed at a substantially 90 degree angle to said first foot inside surface and said second foot outside surface is formed at a substantially 90 degree angle to said second foot inside surface.

10. A system as in claim 1 wherein said control means includes a variable autotransformer for varying the magnitude of current provided by said control means to said electromagnetic coil.

11. A system as in claim 10 including means for manually adjusting said variable autotransformer.

12. A system as in claim 1 wherein said control means includes a switch means for reversing polarity of said DC current provided by said control means to said electromagnetic coil, whereby the direction of said negating magnetic field can be reversed.

13. A system as in claim 12 including means for manually operating said switch means.

14. A method for temporarily, during welding operations, negating remnant magnetic fields that exist in the area of the weld joint formed between two workpieces to be welded together without demagnetizing said workpieces, including:

a. placing an electromagnet on said workpieces in the area of said weld joint, wherein said electromagnet comprises a core and a coil wound on said core, said core including a first foot and a second foot that each form a pole piece of said electromagnet; said electromagnet-placing step including the step of placing said first foot on a first workpiece so that substantial surface coupling is made between said first foot and said first workpiece on a first side of said weld joint, and placing said second foot on a second workpiece so that substantial surface coupling is made between said second foot and said second workpiece on a second side of said weld joint;

b. connecting electrically a source of current to said electromagnet and supplying DC current to said electromagnet to produce a negating magnetic field during welding;

c. measuring the magnetic field in the area of the weld joint;

d. adjusting said current source until said measured magnetic field is minimized.

15. A method as in claim 14 wherein said adjusting step includes increasing the magnitude of current supplied to said electromagnet while observing said measured magnetic field and if said measured magnetic field increases, reducing said magnitude of current to substantially zero, reversing the polarity of said current supplied to said electromagnet, thereby reversing the direction of said negating magnetic field, and thereafter increasing the magnitude of said current until said measured magnetic field is minimized.

16. A system for negating remnant magnetic fields that exist in the area of the weld joint formed between two workpieces to be welded together, comprising:

an electromagnet comprising a core and a coil wound on said core;

a control means electrically connected to said electromagnet for providing current to said coil to provide a negating magnetic field;

said electromagnet core including at least a first foot and a second foot that each form a pole piece of said electromagnet;

said first foot having at least a primary surface for coupling magnetic flux to a first one of said workpieces along a substantial surface area on a first side of said weld joint, and said second foot having at least a primary surface for coupling magnetic flux to a second one of said workpieces along a substantial surface area on a second side of said weld joint, whereby said negating magnetic field is maximized in the area of said weld joint and first means for rotatively connecting said first foot to said core, whereby said first foot may be angularly displaced relative to said core to accommodate various workpiece configurations.

17. A system as in claim 16, further including second means for rotatively connecting said second foot to said core, whereby said second foot may be angularly displaced relative to said core to accommodate various workpiece configurations.

18. A system as in claim 17 wherein said second connecting means includes a pivot.

19. A system as in claim 16 wherein said first connecting means includes a pivot.

20. A method for temporarily, during welding operations, negating remnant magnetic fields that exist in the area of the weld joint formed between two workpieces to be welded together without demagnetizing said workpieces, including:

a. placing an electromagnet on said workpieces in the area of said weld joint, wherein said electromagnet comprises a core and a coil wound on said core, said core including a first foot and a second foot that each form a pole piece of said electromagnet;

said electromagnet-placing step including the step of placing said first foot on a first workpiece so that substantial surface coupling is made between said first foot and said first workpiece on a first side of said weld joint, and placing said second foot on a second workpiece so that substantial surface coupling is made between said second foot and said second workpiece on a second side of said weld joint;

b. connecting electrically a source of current to said electromagnet and supplying DC current to said electromagnet to produce a negating magnetic field during welding;

c. observing magnetic field effects in the area of the weld joint;

d. adjusting said current source until said magnetic field effects are minimized.

* * * * *

UNITED STATES PATENT AND TRADEMARK OFFICE
CERTIFICATE OF CORRECTION

PATENT NO. : 5,345,058
DATED : September 6, 1994
INVENTOR(S) : Robert B. Jones, et al.

It is certified that error appears in the above-identified patent and that said Letters Patent is hereby corrected as shown below:

Column 9, line 10, claim 7, delete "4" and insert --6--.

Signed and Sealed this

Eighth Day of November, 1994

Attest:

BRUCE LEHMAN

Attesting Officer     Commissioner of Patents and Trademarks